United States Patent
Dübal

(12) 
(10) Patent No.: US 6,365,238 B1
(45) Date of Patent: Apr. 2, 2002

(54) CHIP CARD WITH BISTABLE DISPLAY

(75) Inventor: Hans-Rolf Dübal, Eltville (DE)

(73) Assignee: Aventis Research & Technologies GmbH, Frankfurt (DE)

( * ) Notice: Subject to any disclaimer, the term of this patent is extended or adjusted under 35 U.S.C. 154(b) by 0 days.

(21) Appl. No.: 09/423,672

(22) PCT Filed: May 12, 1998

(86) PCT No.: PCT/EP98/02768

§ 371 Date: Jan. 21, 2000

§ 102(e) Date: Jan. 21, 2000

(87) PCT Pub. No.: WO98/52097

PCT Pub. Date: Nov. 19, 1998

(30) Foreign Application Priority Data

May 13, 1997 (DE) .......................................... 197 19 822

(51) Int. Cl.[7] ........................ C09K 19/42; C09K 19/38; G06K 19/067
(52) U.S. Cl. ..................... 428/1.1; 252/299.01; 235/380
(58) Field of Search ..................... 252/299.01; 428/1.1; 235/380

(56) References Cited

U.S. PATENT DOCUMENTS 5,384,069 A * 1/1995 Yoshinaga et al. ...... 252/299.01
5,422,036 A   6/1995 Kawakami et al. .... 252/299.01
5,437,816 A   8/1995 Endo et al. ............ 252/299.65

FOREIGN PATENT DOCUMENTS

| DE | 4218314 | 12/1992 |
| EP | 0291259 | 11/1988 |
| EP | 0297554 | 1/1989 |
| EP | 0844293 | 5/1998 |
| EP | 0292244 | 11/1998 |
| JP | 2-208096 | * 8/1990 |
| JP | 5-264950 | * 10/1993 |
| JP | 5-264953 | * 10/1993 |

OTHER PUBLICATIONS

Patent Abstract of Japan 5–264950, 1993.*

Patent Abstract of Japan 5–264953, 1993.*

Patent Abstracts of Japan No. 02208096 published Aug. 17, 1990.

* cited by examiner

*Primary Examiner*—Shean C. Wu
(74) *Attorney, Agent, or Firm*—Frommer Lawrence & Haug, LLP

(57) ABSTRACT

The present invention describes a chip card having a ferroelectric liquid-crystal display containing a ferroelectric liquid-crystal layer, in which the liquid-crystal layer consists of a mixture of low-molecular-weight (60 to 95% by weight) and polymeric or oligomeric liquid crystals.

2 Claims, No Drawings

CHIP CARD WITH BISTABLE DISPLAY

RELATED APPLICATIONS

This application is filed pursuant to 35 U.S.C. §371 of international application No. PCT/EP98/02768, filed May 12, 1998, which in turn claims priority to German application 197 19 822.8, filed May 13, 1997.

BACKGROUND OF THE INVENTION

1. Field of the Invention

The term "chip card" is generally taken to mean a plastic card, for example in conventional credit card format, provided with an integrated circuit containing electronically stored information.

Chip cards usually consist of PCV or ABS and, in addition to the integrated circuit, additionally contain an "antenna" in the form of a flat coil or electroconductive contacts.

Chip cards are already in widespread use, for example as telephone cards, credit cards, "medicards", cash cards, etc.

In the future, it is expected that this technology will penetrate further into new areas, such as electronic money, replacement of cash, travel tickets and pay TV.

A smart card is a chip card whose integrated circuit controls who uses the stored information and for what purpose.

A desirable feature for chip cards is an electronic display on the card, for example showing the amount stored. Such a display facilitates, for example, display of the amount remaining on a telephone card.

Such a display should be visible even without application of an electric voltage, since neither the thickness nor the production costs of a card allow the installation of a battery. The display must thus be capable of optical storage.

2. Description of the Related Art

For reasons of optical bistability, ferroelectric liquid-crystal displays (FLCDs) and also bistable nematic displays have been proposed (see R. Bürkle, R. Klette, E. Lüder, R. Bunz, T. Kallfass, 1997 International Symposium, Seminar & Exhibition, Society of Information Display, Boston, Mass., Abstract 9.4, page 34).

The use of FLCDs would have the advantage of a low operating voltage, which can easily be in the range below 5 volts. This technology has the disadvantages of high sensitivity to shock, pressure and deformation, and the difficulty in aligning the smectic layers, which tend to form contrast-reducing deformations and defects in the crystal structure.

Besides likewise having high mechanical sensitivity, bistable nematic displays have the additional disadvantage of relatively high switching voltages, which are above 20 V.

The object of finding a mechanically and thermally stable, optically bistable chip card display which can be operated at voltages below 15 volts, preferably below five volts and has high contrast and high brightness or reflectivity is, surprisingly, achieved by using mixtures of low-molecular weight and polymeric or oligomeric FLCs.

SUMMARY OF THE INVENTION

The invention therefore relates to a chip card having a ferroelectric liquid-crystal display, wherein the liquid-crystal layer consists of a mixture of a low-molecular weight liquid crystal and a polymeric or oligomeric liquid crystal.

DETAILED DESCRIPTION

The display according to the invention can be switched at voltages >15 V, generally >5V, can be written in a broad temperature range and is robust to everyday loads, such as pressure, flexing or thermal deformation.

The display according to the invention has a high switching angle, a low switching voltage and low temperature dependence. Defect lines can be suppressed.

The low-molecular-weight, tilted smectic, optically active (ferroelectric) liquid-crystal (FLC) preferably consists of a mixture of low-molecular-weight compounds. The operating phase is preferably the $S_C^*$ phase. The mixtures preferably comprise a non-optically active base mixture, preferably in a proportion of >50%, and one or more optically active compounds (dopants). The low-molecular-weight FLCD generally has a spontaneous polarization of from 2 to 40 $nCcm^{-2}$.

Suitable compounds for the low-molecular-weight FLC are known to the person skilled in the art.

Generally suitable compounds can be described, for example, by the general formula (I),

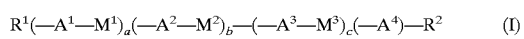

$$R^1(-A^1-M^1)_a(-A^2-M^2)_b-(-A^3-M^3)_c(-A^4)-R^2 \qquad (I)$$

where the symbols and indices are defined as follows:

$R^1$ and $R^2$ are identical or different and are
  a) hydrogen,
  b) a straight-chain or branched alkyl radical (with or without an asymmetrical carbon atom) having 1 to 20 carbon atoms, where
    b1) one or more non-adjacent and non-terminal $-CH_2-$ groups may be replaced by $-O-$, $-S-$, $-CO-O-$, $-O-CO-$, $-O-CO-O-$ or $-Si(CH_3)_2-$, and/or
    b2) one or more $-CH_2-$ groups may be replaced by $-CH=CH-$, $-C/C-$, cyclopropane-1,2-diyl, 1,4-phenylene, 1,4-cyclohexylene or 1,3-cyclopentylene, and/or
    b3) one or more H atoms may be replaced by F and/or Cl, and/or
    b4) the terminal $CH_3$ group may be replaced by one of the following chiral groups (optically active or racemic):

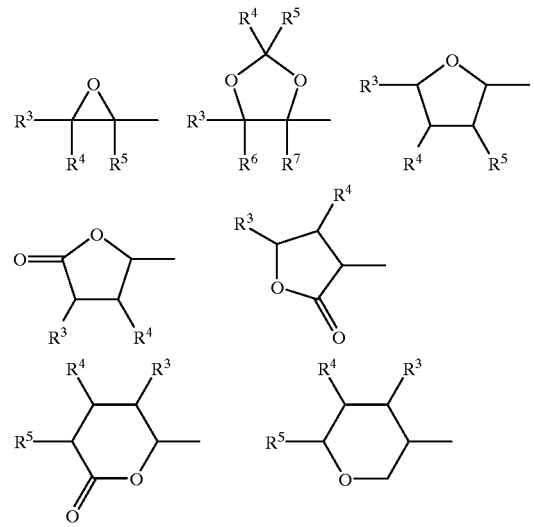

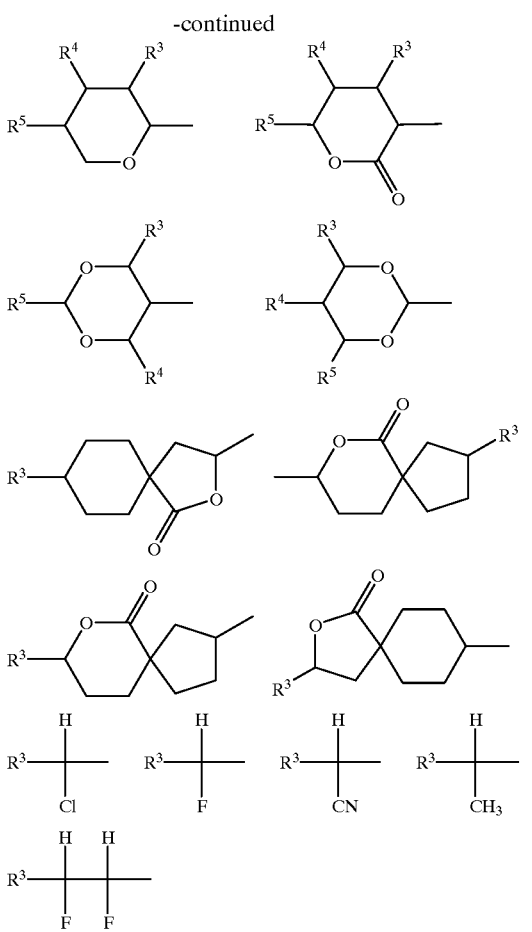

with the proviso that at most one of the radicals $R^1$ and $R^2$ is hydrogen;

$R^3$, $R^4$, $R^5$, $R^6$ and $R^7$ are identical or different and are
  a) hydrogen
  b) a straight-chain or branched alkyl radical (with or without an asymmetrical carbon atom) having 1 to 16 carbon atoms, where
     b1) one or more non-adjacent and non—terminal —$CH_2$— groups may be replaced by —O—, and/or
     b2) one or two $CH_2$ groups may be replaced by —CH=CH—,
  c) $R^4$ and $R^5$ together may alternatively be —$(CH_2)_4$— or —$(CH_2)_5$— if they are bonded to an oxirane, dioxolane, tetrahydrofuran, tetrahydropyran, butyrolactone or valerolactone system;

$M^1$, $M^2$ and $M^3$ are identical or different and are —CO—O—, —O—CO—, —CO—S—, —S—CO—, —CS—O—, —O—CS—, —$CH_2$—O—, —O—$CH_2$—, —$CH_2$—S—, —S—$CH_2$—, —CH=CH—, —C≡C—, —$CH_2$—$CH_2$—CO—O—, —O—CO—$CH_2$—$CH_2$— or a single bond;

$A^1$, $A^2$, $A^3$ and $A^4$ are identical or different and are 1,4-phenylene, in which one or more H atoms may be replaced by F, Cl and/or CN, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,4-cyclohexylene, in which one or two H atoms may be replaced by CN and/or $CH_3$ and/or F, 1,3,4-thiadiazole-2,5-diyl, 1,3-dioxane-2,5-diyl, 1,3-dithiane-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4-diyl, in which one H atom may be replaced by F, Cl and/or CN, thiophene-2,5-diyl, in which one or two H atoms may be replaced by F, Cl and/or CN, naphthalene-2,6-diyl, in which one or more H atoms may be replaced by F, Cl and/or CN, phenanthrene-2,7-diyl or 5,10-dihydrophenanthrene-2,7-diyl, in each of which one, two or more H atoms may be replaced by F and one or two CH groups may be replaced by N, or 1,3-dioxaborinane-2,5-diyl;

a, b and c are 0 or 1; and the sum of a, b and c is 1, 2 or 3.

The low-molecular-weight liquid crystal generally comprises from 2 to 35, preferably from 2 to 25, particularly preferably from 2 to 20 components.

The components of the low-molecular weight liquid crystal are preferably selected from known compounds having smectic and/or nematic and/or cholesteric phases, for example of the formula (I). These include, for example:

derivatives of phenylpyrimidine, as described, for example, in WO 86/06401 and U.S. Pat. No. 4,874,542, meta-substituted six-membered-ring aromatic compounds, as described, for example, in EP-A 0 578 054, silicon compounds, as described, for example, in EP-A 0 355 008, mesogenic compounds having only one side chain, as described, for example, in EP-A 0 541 081, hydroquinonone derivatives, as described, for example, in EP-A 0 603 786, phenylbenzoates, as described, for example, in P. Keller, Ferroelectrics 1984, 58, 3, and J. W. Goodby et al., Liquid Crystals and Ordered Fluids, Vol. 4, New York, 1984, and thiadiazoles, as described, for example, in EP-A 0 309 514.

Examples of suitable chiral, non-racemic dopants are the following:

optically active phenylbenzoates, as described, for example, in P. Keller, Ferroelectrics 1984, 58, 3, and J. W. Goodby et al., Liquid Crystals and Ordered Fluids, Vol. 4, New York, 1984, optically active oxirane ethers, as described, for example, in EP-A 0 263 437 and WO-A 93/13093, optically active oxirane esters, as described, for example, in EP-A 0 292 954, optically active dioxolane ethers, as described, for example, in EP-A 0 351 746, optically active dioxolane esters, as described, for example, in EP-A 0 361 272, optically active tetrahydrofuran-2-carboxylic esters, as described, for example, in EP-A 0 355 561, and optically active 2-fluoroalkyl ethers, as described, for example, in EP-A 0 237 007 and U.S. Pat. No. 5,051,506.

Particularly preferred components of the low-molecular-weight liquid crystal are those in Groups A to M:

A. Phenylpyrimidine Derivatives of the Formula (II)

$$R^1-A^1-A^2-R^2 \quad (II)$$

in which

R$^1$ and R$^2$ are each alkyl having 1–15 carbon atoms, in which, in addition, one or two non-adjacent —CH$_2$— groups may be replaced by —O—, —S—, —CO—, —O—CO—, —CO—O—, —O—CO—O—, —O—S—, —S—CO—, —CHHalogen, —CHCN— and/or —CH=CH— and in which one, more than one or all H atoms may be replaced by F, A$^1$ is 1,4-phenylene, trans-1,4-cyclohexylene or a single bond, and A$^2$ is

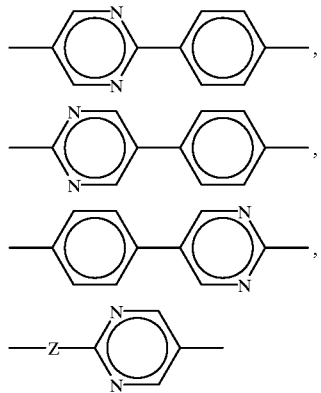

where Z is —O—CO—, —CO—O—, —S—CO—, —CO—S—, —CH$_2$O—, —OCH$_2$— or —CH$_2$CH$_2$—.

B. Compounds Having Only one Side Chain, of the Formula (III)

$$R^1(-A^1)_a(-M^1)_b(-A^2)_c(-M^2)_d(-A^3)_e(-M^3)_f(-A_4)-H \quad (III)$$

in which:

R$^1$ is a straight-chain or branched alkyl radical having 1 to 22 or 3 to 22 carbon atoms respectively, in which one or two non-adjacent —CH$_2$— groups may also be replaced by —O—, —CO—, —CO—O—, —O—CO—, —O—CO—O— or —Si(CH$_3$)$_2$—, A$^1$, A$^2$, A$^3$ and A$^4$ are identical or different and are 1,4-phenylene, in which one or two H atoms may be replaced by F or CN, pyridine-2,5-diyl, in which one or two H atoms may be replaced by F, pyrimidine-2,5-diyl, in which one or two H atoms may be replaced by F, trans-1,4-cyclohexylene, 1,3,4-thiadiazole-2,5-diyl or naphthalene-2,6-diyl, M$^1$, M$^2$ and M$^3$ are identical or different and are —CO—O—, —O—CO—, —CH$_2$—O—, —O—CH$_2$— or —CH$_2$—CH$_2$—, a, b, c, d, e and f are zero or one, with the proviso that the sum a+c+e is 0, 1, 2 or 3.

C. Meta-substituted Compounds of the Formula (IV)

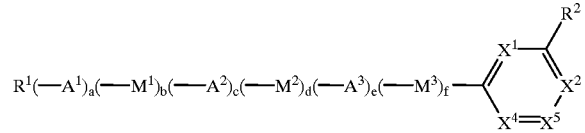

in which

R and R are identical or different and are a straight-chain or branched alkyl radical having 1 to 22 or 3 to 22 carbon atoms respectively, in which, in addition, one or two non-adjacent —CH$_2$— groups may be replaced by —O—, —CO—, —CO—O—, —O—CO—, —O—CO—O— or —Si(CH$_3$)$_2$—, A$^1$, A$^2$ and A$^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, and A$^1$ is alternatively

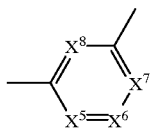

M$^1$, M$^2$ and M$^3$ are identical or different and are —O—, —CO—O—, —O—CO—, —CH$_2$—O—, —O—CH$_2$— or —CH$_2$—CH$_2$—, X$^1$, X$^2$, X$^3$, X$^4$, X$^5$, X$^6$, X$^7$ and X$^8$ are CH or N, the number of N atoms per six-membered ring being 0, 1 or 2, a, b, c, d, e and f are zero or one, with the proviso that the sum of a+c+e is 0, 1, 2 or 3.

D. Silicon Compounds of the Formula (V)

$$R^1(-A^1)_i(-M^1)_k(-A^2)_l(-M^2)_m(-A^3)_n-R^2 \quad (V)$$

in which

R$^1$ is straight-chain or branched alkyl having 1 to 22 or 3 to 22 carbon atoms respectively, in which, in addition, one or two non-adjacent —CH$_2$— groups may be replaced by —O—, —CO—, —CO—O—, —O—CO— or —O—CO—O—, R$^2$ is straight-chain or branched alkyl having 1 to 22 or 3 to 22 carbon atoms respectively, in which, in addition, one or two non-adjacent —CH$_2$— groups may be replaced by —O—, —CO—, —CO—O—, —O—CO— or —O—CO—O—, with the proviso that one —CH$_2$— group not bonded to oxygen is replaced by —Si(CH$_3$)$_2$—, A$^1$, A$^2$ and A$^3$ are identical or different and are 1,4-phenylene, in which one or two H atoms may be replaced by F, trans-1,4-cyclohexylene, pyridine-2,5-diyl, in which one or two H atoms may be replaced by F, pyrimidine-2,5-diyl, in which one or two H atoms may be replaced by F, or 1,3,4-thiadiazole-2,5-diyl, $M^1$ and $M^2$ are identical or different and are —CO—O—, —O—CO—, —CH$_2$—O— or —O—CH$_2$—, i, k, l, m and n are zero or 1, with the proviso that i+l+n=2 or 3.

E. Hydroquinone Derivatives of the Formula (VI)

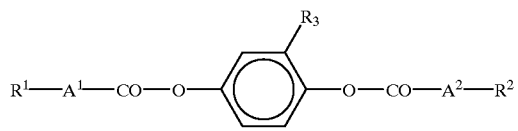

(VI)

in which $R^1$ and $R^2$ are identical or different and are a straight-chain or branched alkyl radical having 1 or 3 to 16 carbon atoms, preferably 1 or 3 to 10 carbon atoms respectively, in which, in addition, one or two non-adjacent —CH$_2$— groups may be replaced by —O—, —CO—, —O—CO—, —CO—O— or —O—CO—O—, preferably —O—, —O—CO— or —CO—O—, $R^3$ is —CH$_3$, —CF$_3$ or —C$_2$H$_5$, preferably —CH$_3$ or —CF$_3$, $A^1$ and $A^2$ are identical or different and are

or

, preferably

.

F. Pyridylpyrimidines of the Formula (VII)

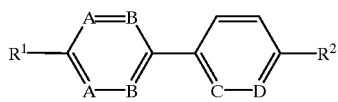

(VII)

in which

A is N and B is CH or A is CH and B is N, C is N and D is CH or C is CH and D is N, where one or two CH groups may be replaced by CF groups, $R^1$ and $R^2$ are identical or different and are a straight-chain or branched alkyl radical having 1 to 22 or 3 to 22 carbon atoms respectively, in which, in addition, one or two non-adjacent —CH$_2$— groups may be replaced by —O—, —CO—, —CO—O—, —O—CO— or —O—CO—O—.

G. Phenylbenzoates of the Formula (VIII)

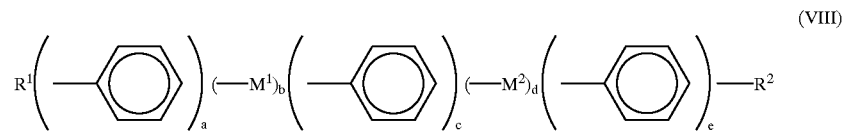

(VIII)

in which

R¹ and R² are identical or different and are a straight-chain or branched alkyl radical having 1 to 22 or 3 to 22 carbon atoms respectively, in which, in addition, one or two non-adjacent —CH₂— groups may be replaced by —O—, —CO—, —CO—O—, —O—CO— or —O—CO—O—, M¹ and M² are identical or different and are —CO—O— or —O—CO—, a, b, c, d and e are zero or one, with the proviso that a+c+e=2 or 3 and b+d=1 or 2.

H. Optically Active Phenylbenzoates of the Formula (IX)

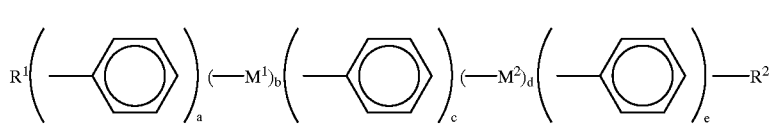

(IX)

in which

R¹ and R² are identical or different and are a straight-chain or branched alkyl radical having 1 to 22 or 3 to 22 carbon atoms respectively, in which, in addition, one or two non-adjacent —CH₂— groups may be replaced by —O—, —CO—, —CO—O—, —O—CO— or —O—CO—O—, and in which at least one of the radicals R¹ and R² is a branched, optically active alkyl group, M¹ and M² are identical or different and are —CO—O—, —O—CO— or a single bond, and a, b, c, d and e are zero or one, with the proviso that a+c+e2 or 3 and b+d=1or 2.

I. Optically active oxirane ethers of the formula (X)

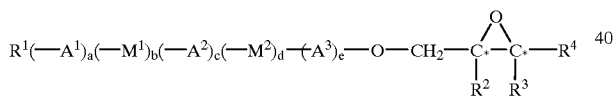

(X)

in which the symbols and indices are as defined below:

is a center of chirality,

R¹ is a straight-chain or branched alkyl radical having 1 to 22 or 3 to 22 carbon atoms respectively, in which, in addition, one or two non-adjacent —CH₂— groups may be replaced by —O—, —CO—, —CO—O—, —O—CO—, —O—CO—O— or —Si(CH₃)₂—, or the following optically active group,

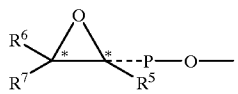

R², R³, R⁴, R⁵, R⁶ and R⁷ are identical or different and are H or a straight-chain or branched alkyl radical having 1 to 16 carbon atoms, P is —CH₂— or —CO—, A¹, A² and A³ are identical or different and are 1,4-phenylene, in which one or two H atoms may be replaced by F, pyridine-2,5-diyl, in which one or two H atoms in each case may be replaced by F, pyrimidine-2,5-diyl, in which one or two H atoms may be replaced by F, trans-1,4-cyclohexylene, in which one or two H atoms may be replaced by —CN and/or —CH₃, or 1,3,4-thiadiazole-2,5-diyl, M¹ and M² are identical or different and are —CO—O—, —O—CO—, —CH₂—O—, —O—CH₂— or —CH₂—CH₂—, and a, b, c, d and e are zero or one.

The asymmetrical carbon atoms in the oxirane ring or rings can have identical or different R or S configurations.

J. Optically active oxirane esters of the formula (XI)

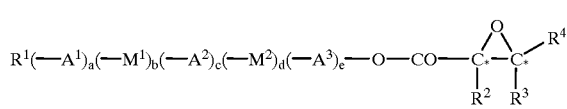

(XI)

in which the symbols and indices are as defined below:

is a center of chirality,

R¹ is a straight-chain or branched alkyl radical having 1 to 22 or 3 to 22 carbon atoms respectively, in which, in addition, one or two non-adjacent —CH₂— groups may be replaced by —O—, —CO—, —CO—O—, —O—CO—, —O—CO—O— or —Si(CH₃)₂—, R² R³ and R⁴ are identical or different and are H or a straight-chain or branched alkyl radical having 1 to 16 carbon atoms, A¹, A² and A³ are identical or different and are 1,4-phenylene, in which one or two H atoms may be replaced by F, pyridine-2,5-diyl, in which one or two H atoms in each case may be replaced by F, pyrimidine-2,5-diyl, in which one or two H atoms may be replaced by F, trans-1,4-cyclohexylene, in which one or two H atoms may be replaced by —CN and/or —CH₃, or 1,3,4-thiadiazole-2,5-diyl, M¹ and M² are identical or different and are —CO—O—, —O—CO—, —CH₂—O—, —O—CH₂— or —CH₂—CH₂—, and a, b, c, d and e are zero or one.

The asymmetrical carbon atoms in the oxirane ring can have identical or different R or S configurations.

K. Optically active dioxolane ethers of the formula (XII)

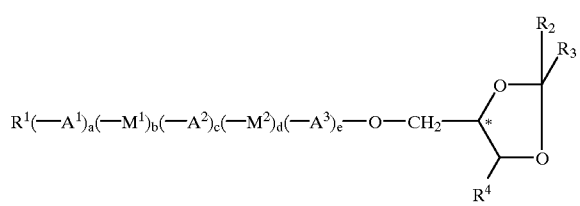

(XII)

in which the symbols and indices are as defined below:

is a center of chirality, $R^1$ is a straight-chain or branched alkyl radical having 1 to 22 or 3 to 22 carbon atoms respectively, in which, in addition, one or two non-adjacent —$CH_2$— groups may be replaced by —O—, —CO—, —CO—O—, —O—CO—, —O—CO—O— or —Si($CH_3$)$_2$—, $R^2$ $R^3$ and $R^4$ are identical or different and are H, a straight-chain or branched alkyl radical having 1 to 16 or 3 to 10 carbon atoms respectively or an alkenyl radical having 2 to 16 carbon atoms, where $R^2$ and $R^3$ together may also be —($CH_2$)$_5$—, $A^1$ $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —$CH_3$, or 1,3,4-thiadiazole-2,5-diyl, $M^1$ and $M^2$ are identical or different and are —CO—O—, —O—CO—, —$CH_2$—O—, —O—$CH_2$— or —$CH_2$—$CH_2$—, and a, b, c, d and e are zero or one.

The asymmetrical carbon atoms in the dioxolane ring can have identical or different R or S configurations.

L. Optically active dioxolane esters of the formula (XIII)

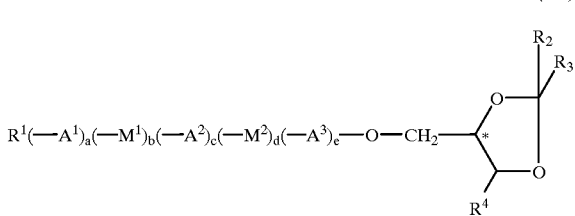

(XII)

in which the symbols and indices are as defined below:

is a center of chirality, $R^1$ is a straight-chain or branched alkyl radical having 1 to 16 or 3 to 16 carbon atoms respectively, in which, in addition, one or two non-adjacent —$CH_2$— groups may be replaced by —O—, —CO—, —O—CO— or —CO—O—, $R^2$, $R^3$ and $R^4$ are identical or different and are H or an alkyl or alkenyl radical having 1 to 10 or 2 to 10 carbon atoms respectively, where $R^2$ and $R^3$ together may also be —($CH_2$)$_5$—, $A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —$CH_3$, or 1,3,4-thiadiazole-2,5-diyl, $M^1$ and $M^2$ are identical or different and are —CO—O—, —O—CO—, —$CH_2$—O—, —O—$CH_2$— or —$CH_2$—$CH_2$—, and a, b, c, d and e are zero or one.

The asymmetrical carbon atoms in the dioxolane ring can have identical or different R or S configurations.

M. Macrocyclic Compounds of the Formula (XIV)

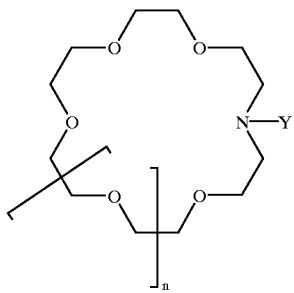

(XIV)

in which n is 0 or, and

Y is —CO-(t-butyl) or —CO-(adamantyl).

Such mixtures of low-molecular-weight and polymeric or oligomeric ferroelectric liquid crystals facilitate bistable displays which, owing to the content of low-molecular-weight compounds of, preferably, at least 50% by weight, but in particular between 60 and 95% by weight, can be operated at a sufficiently low switching voltage. The content of polymers or oligomers is selected so that defect lines are suppressed and a high switching angle is established. On the other hand, the polymer content is sufficiently low to facilitate a low switching voltage and low temperature dependence. Suitable low-molecular-weight FLC mixtures are also commercially available, for example ®FELIX 13, 14, 15 and 17 (Hoechst AG, Frankfurt/Main, Germany), in particular ®FELIX 17.

The polymeric or oligomeric liquid crystal consists of one or more ferroelectric polymers and/or oligomers. According to Römpps Chemie Lexikon [Römpp's Lexicon of Chemistry], 9th Edn., Georg Thieme Verlag, Stuttgart, 1989–92, oligomers are compounds in whose molecule only a few constitutional units of the same or different types are linked to one another and whose physical properties change significantly when the size of the molecule is changed by addition or removal of one or more of the constitutional units—in contrast to the polymer.

In general, the ferroelectric polymers are side-chain polymers. Suitable classes of compound are, for example, polyacrylates, polyethers, polysiloxanes and polyesters.

The polymers can be homopolymers or copolymers, where the term copolymers is not restricted merely to two different constitutional units.

Preferred polymers are those of the general formula (XV),

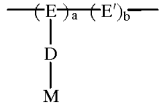

(XV)

in which

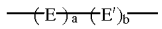

is a polymer chain,

D is a spacer group,

M is a mesogenic group, and b canalsobe 0.

Copolymers (b≈0) can be alternating (ordered), random or block copolymers.

The main polymer chain is preferably a polyacrylate, polymethacrylate, polyether, polysiloxane or polyester.

Various spacer groups D known to the person skilled in the art can be employed; for example, D is a group of the formula $$(Y)_f(Z)$$

in which the symbols and indices are as defined below:

Y is —COO—, —O—CO—, —O—CO—O—, —O— or —S—;

Z is a branched or unbranched alkyl group having from 1 to 30 carbon atoms, in which one or more —CH$_2$— groups may be replaced by —O— and in which one or more H atoms may be replaced by F, and f is 0 or 1.

The mesogenic group M is preferably a group of the formula (XVI), $$(-A^1-M^1)_a(-A^2-M^2)_b-(-A^3-M^3)_c(-A^4)-R^1$$

in which the symbols and indices are defined as follows:

$R^1$ is optically active and is
  a) a straight-chain or branched alkyl radical (with or without an asymmetrical carbon atom) having 1 to 20 carbon atoms, where
    a1) one or more non-adjacent and non-terminal —CH$_2$— groups may be replaced by —O—, —S—, —CO—O—, —O—CO—, —O—CO—O— or —Si(CH$_3$)$_2$—, and/or
    a2) one or more —CH$_2$— groups may be replaced by —CH=CH—, —C≡C—, cyclopropane-1,2-diyl, 1,4-phenylene, 1,4-cyclohexylene or 1,3-cyclopentylene, and/or
    a3) one or more H atoms may be replaced by F and/or Cl, and/or
    a4) the terminal —CH$_3$ group may be replaced by one of the following chiral groups (optically active or racemic):

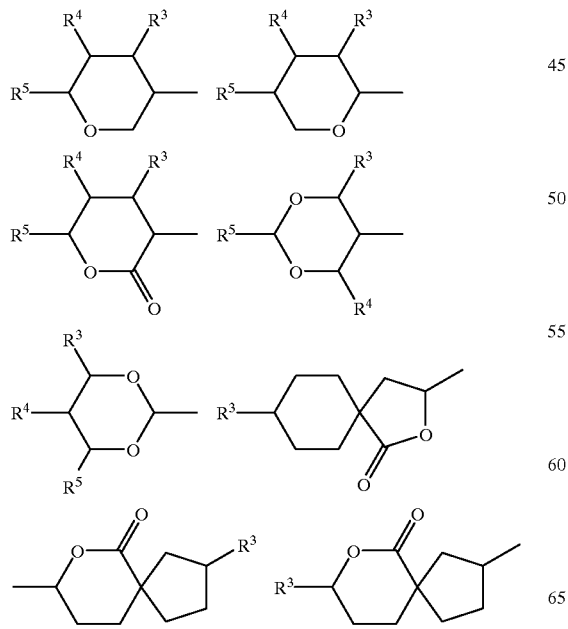

-continued

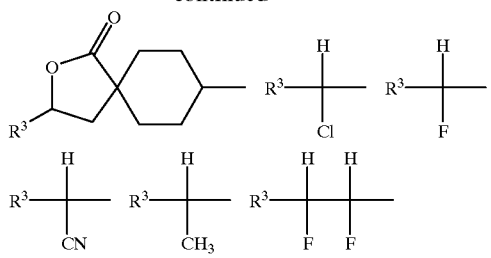

$R^3$, $R^4$, $R^5$, $R^6$ and $R^7$ are identical or different and are
  a) hydrogen
  b) a straight-chain or branched alkyl radical (with or without an asymmetrical carbon atom) having 1 to 6 carbon atoms, where
    b1) one or more non-adjacent and non-terminal —CH$_2$— groups may be replaced by —O—, and/or
    b2) one or two —CH$_2$— groups may be replaced by —CH=CH—,
  c) R and R together may alternatively be —(CH$_2$)$_4$— or —(CH$_2$)$_5$— if they are bonded to an oxirane, dioxolane, tetrahydropyran, butyrolactone or valerolactone system;

$M^1$, $M^2$ and $M^3$ are identical or different and are —CO—O—, —O—CO—, —CO—S—, —S—CO—, —CS—O—, —O—CS—, —CH$_2$—O—, —O—CH$_2$—, —CH$_2$—S—, —S—CH$_2$—, —CH=CH—, —C≡C—, —CH$_2$—CH$_2$—CO—O—, —O—CO—CH$_2$—CH$_2$— or a single bond;

$A^1$, $A^2$, $A^3$ and $A^4$ are identical or different and are 1,4-phenylene, in which one or more H atoms may be replaced by F, Cl and/or CN, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,4-cyclohexylene, in which one or two H atoms may be replaced by CN and/or CH$_3$ and/or F, 1,3,4-thiadiazole-2,5-diyl, 1,3-dioxane-2,5-diyl, 1,3-dithiane-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4-diyl, in which one H atom may be replaced by F, Cl and/or CN, thiophene-2,5-diyl, in which one or two H atoms may be replaced by F, Cl and/or CN, naphthalene-2,6-diyl, in which one or more H atoms may be replaced by F, Cl and/or CN, or 1,3-dioxaborinane-2,5-diyl;

a, b and c are 0 or 1; and the sum of a, b and c is 1, 2 or 3.

Preferred mesogenic groups are those of the formula Z—R$^1$ in which Z is from the group consisting of

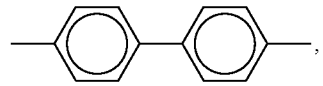

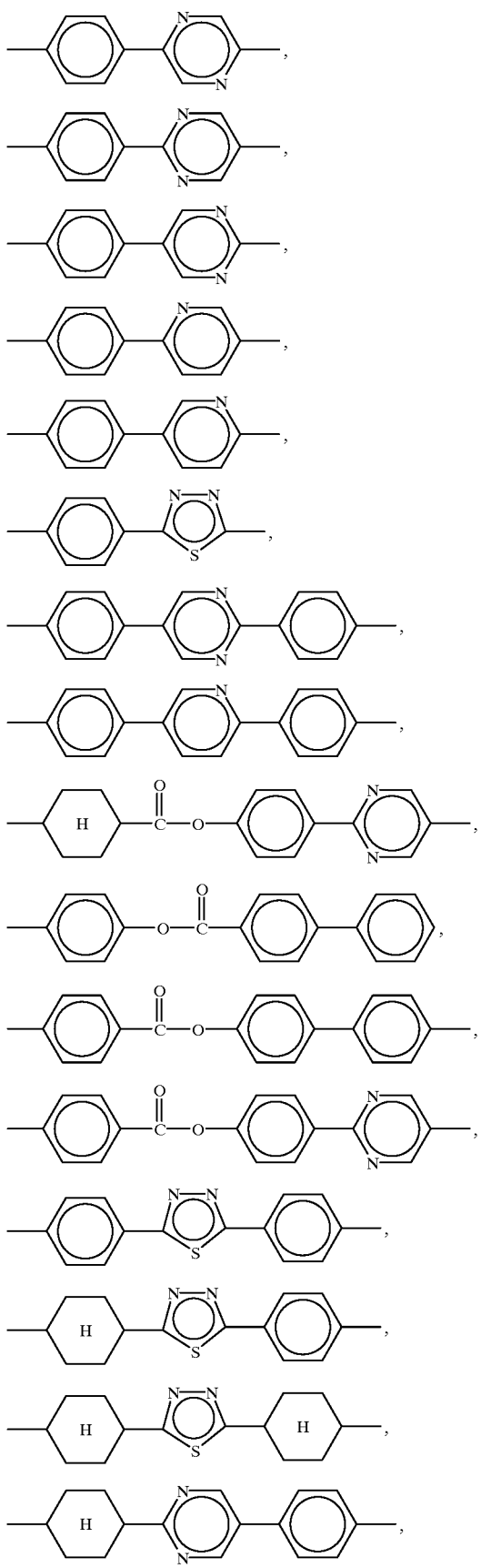

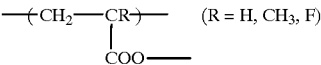

and
R¹ is as defined above.

Particularly preferred main-chain structures are the following:

a) Polymethacrylates

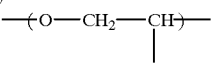

b) Polyethers c) Polysiloxanes

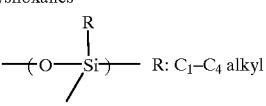

d) Polyesters

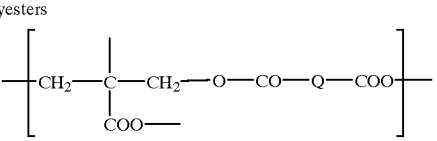

$Q=(CH_2)_n$, in which n=1 to 20, or 1,4-phenylene or naphthalene-2,6-diyl.

Very particular preference is given to polyacrylates.

Particularly preferred polymeric liquid crystals are the polymers disclosed in the following specifications:

| | | | |
|---|---|---|---|
| US-4,904,065 | US-4,818,807 | EP-A-0 231 770 | EP-A-0 228 703 |
| EP-A-0 424 461 | US-5,288,425 | US-5,227,090 | EP-A-0 428 542 |
| DE-A 43 00 435 | | | |

These specifications are expressly incorporated herein by way of reference and through quoting thereof are regarded as part of the description.

The polymeric liquid crystal is very particularly preferably the following polyacrylate:

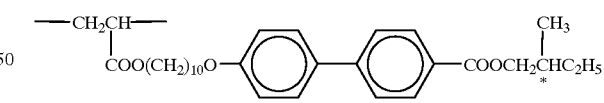

The polymeric, oligomeric and low-molecular-weight liquid-crystal components are prepared by methods known per se which are familiar to the person skilled in the art, as described, for example, in Houben-Wehl, Methoden der organischen Chemie [Methods of Organic Chemistry], Georg Thieme Verlag, Stuttgart, or the publications cited therein.

The mixtures employed in accordance with the invention preferably comprise ≧50% by weight, particularly preferably from 60 to 95% by weight, very particularly preferably from 65 to 80% by weight, of the low-molecular-weight component. The mixture is prepared by methods known per se.

The display according to the invention is generally addressed directly or in multiplex mode (see, for example, Jean Dijon in Liquid Crystals, Application and Uses (Ed. B. Bahadur), Vol. 1, 1990, Chapter 13, pp. 305–360, or T. Harada, M. Taguchi, K. Iwasa, M. Kai, SID Digest, page 131 (1985)).

The plastic edges used are known and the majority are commercially available (for example Gemplus, http://www.gemplus.fr). They consist, for example, of PVC (polyvinyl chloride) or ABS (acrylonitrile-butadiene-styrene copolymer).

The chip card according to the invention is suitable, for example, as a check card, electronic travel ticket or for pay TV.

The invention is explained in greater detail by the examples.

EXAMPLE

A flexible plastic film (obtainable, for example, from Sumitomo Bakelite, product code FST 5352, thickness 100 μm, 200 Ω/coated with indium-tin oxide) is structured in a photolithographic process to give an electrode pattern. The transparent conductor tracks of this electrode structure are used for electrical addressing of the display. Two structured films forming the top and bottom of the display are joined with the aid of an adhesive frame and filled with a mixture of 19.5% by weight of the liquid-crystalline acrylate

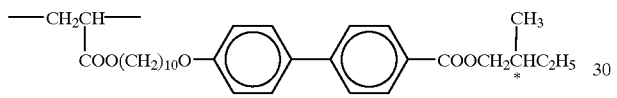

and 80% or weight of a ferroelectric $Sm_C^*$ broad-band mixture (®Felix 17, Hoechst AG, Frankfurt, Germany) and a concentration of 0.5% by weight of spacer beads. The adhesive is hardened, and the cell is sealed, aligned by slow cooling to the operating temperature and installed in a smart card between a pair of polarizing films. The cell electrode contacts, which are routed to the outside, are connected to the corresponding contacts or flat coils of the smart card. When a voltage of 10 V is applied, this cell can be operated at 25° C.

What is claimed is:

1. A chip card comprised of a ferroelectric liquid-crystal display, comprising a ferroelectric liquid-crystal layer, wherein the liquid-crystal layer consists of a mixture of low-molecular weight and polymeric or oligomeric liquid crystals, wherein the mixture contains 60 to 95% by weight of the low-molecular weight component, and wherein the polymeric liquid crystals are side chain polymers having a polyacrylate, polymethacrylate or polysiloxane main chain and side chains of the formula:

wherein Z is selected from the group consisting of:

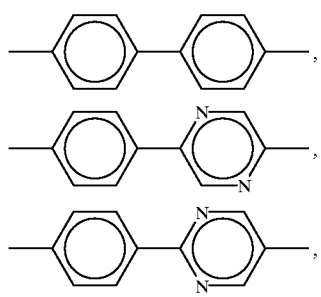

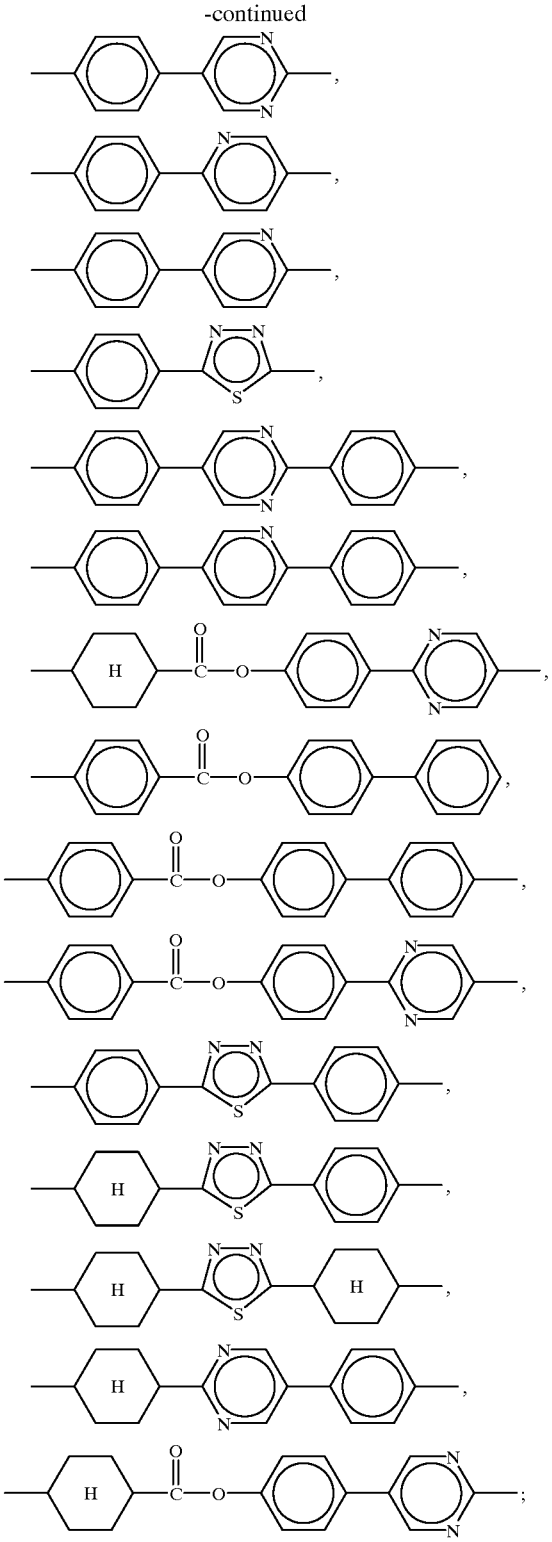

D is a spacer group; and $R^1$ is optically active and is a straight-chain or branched alkyl radical, with or without an asymmetrical carbon atom, having 1 to 20 carbon atoms, wherein:

A) one or more non-adjacent and non-terminal —$CH_2$— groups may be replaced by —O—, —S—, —CO—O—, —O—CO—, —OCO—O— or —Si$(CH_3)_2$—, and/or B) one or more —CH$_2$— groups may be replaced by —CH=CH—, —CH≡CH—, cyclopropane-1,2-diyl, 1,4-phenylene, 1,4-cyclohexylene or 1,3-cyclopentylene, and/or
C) one or more H atoms may be replaced by F and/or Cl, and/or
D) the terminal —CH$_3$ group may be replaced by one of the following optically active or racemic chiral groups:

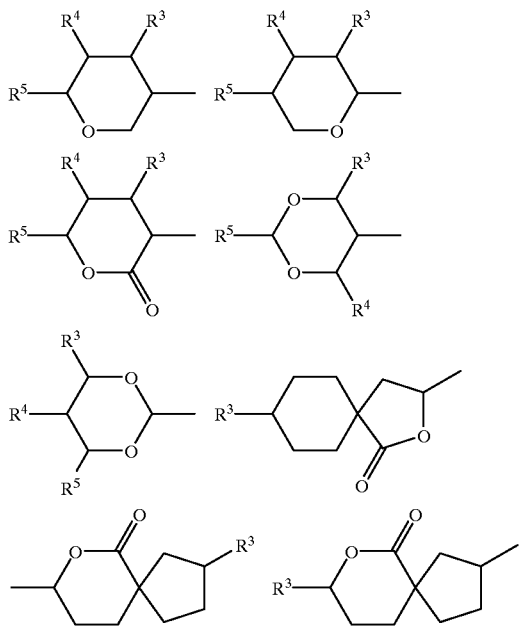

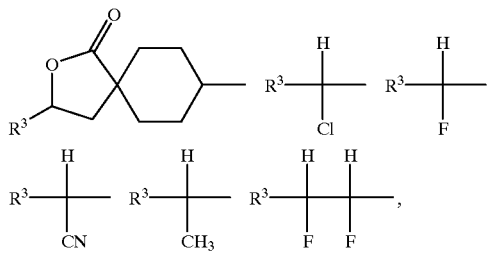

wherein $R^3$, $R^4$, $R^5$, $R^6$ and $R^7$ are identical or different and are:
1) hydrogen, or
2) a straight-chain or branched alkyl radical, with or without an asymmetrical carbon atom, having 1 to 6 carbon atoms, wherein
   i) one or more non-adjacent and non-terminal —CH$_2$— groups may be replaced by —O—, and/or
   ii) one or two —CH$_2$— groups may be replaced by —CH=CH—, and
3) $R^4$ and $R^5$ together may alternatively be —(CH$_2$)$_4$— or —(CH$_2$)$_5$— if they are bonded to an oxirane, dioxolane, tetrahydropyran, butyrolactone or valerolactone system.

2. The chip card according to claim 1, wherein the ferroelectric liquid-crystal display further comprises outer plates comprised of coated polymer films.

* * * * *